United States Patent
Borner et al.

[11] 3,819,249
[45] June 25, 1974

[54] OPTICAL COUPLING ARRANGEMENT

[75] Inventors: Manfred Borner, Ulm/Donau; Stefan Maslowski, Aufheim; Oskar Krumpholz, Ulm/Donau, all of Germany

[73] Assignee: Licentia Patent-Verwaltungs-GmbH, Frankfurt am Main, Germany

[22] Filed: Oct. 1, 1971

[21] Appl. No.: 185,690

[30] Foreign Application Priority Data
Oct. 2, 1970  Germany............................ 2048439
Oct. 2, 1970  Germany............................ 7036438

[52] U.S. Cl.............. 350/96 WG, 65/3, 65/DIG. 7, 350/96 R
[51] Int. Cl. ............................................. G02b 5/14
[58] Field of Search............ 350/96 WG, 96 B, 96 R

[56] References Cited
UNITED STATES PATENTS
| | | | |
|---|---|---|---|
| 3,043,910 | 7/1962 | Hicks | 350/96 B X |
| 3,295,911 | 1/1967 | Ashkin et al. | 350/96 WG UX |
| 3,395,366 | 7/1968 | Snitzer et al. | 350/96 WG X |
| 3,563,630 | 2/1971 | Anderson et al. | 350/96 WG |
| 3,579,316 | 5/1971 | Dyott et al. | 350/96 WG X |
| 3,590,248 | 6/1971 | Chatterton | 350/96 WG UX |
| 3,610,755 | 10/1971 | Wieberger et al. | 350/96 R UX |
| 3,614,197 | 10/1971 | Nishizawa et al. | 350/96 WG |
| 3,614,198 | 10/1971 | Martin et al. | 350/96 WG |
| 3,663,194 | 5/1972 | Greenstein et al. | 350/96 WG UX |

OTHER PUBLICATIONS

Keune et al. "Thin Semiconductor Laser to Thin Platelet Optical Coupler," Laser Focus, Vol. 6, No. 4, April, 1970, p. 8.

*Primary Examiner*—John K. Corbin
*Attorney, Agent, or Firm*—Spencer & Kaye

[57] ABSTRACT

A coupling arrangement for coupling a light beam from an output of one optical device to an input of another optical device. At least one of the two optical devices is a light conductive fiber having a substantially totally reflecting core in a major portion of the fiber. The light conductive fiber is provided at a coupling point with an effective entrance surface or exit surface for the light beam which is larger than the cross section of the substantially totally reflecting core.

24 Claims, 9 Drawing Figures

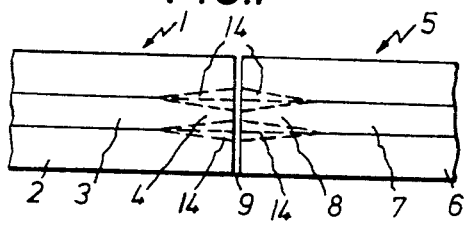
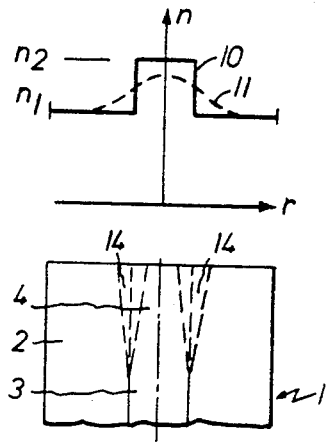
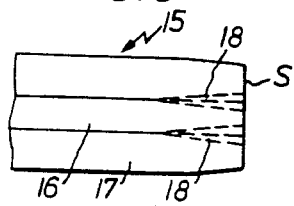
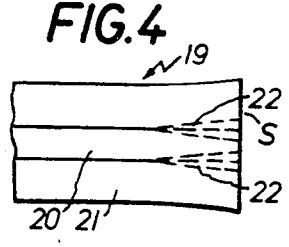
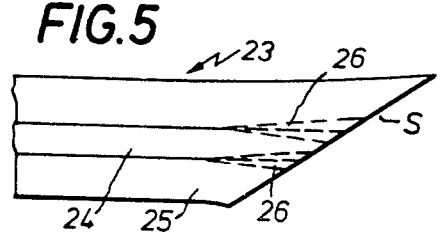
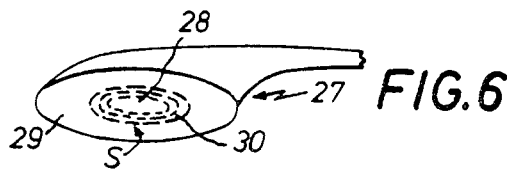
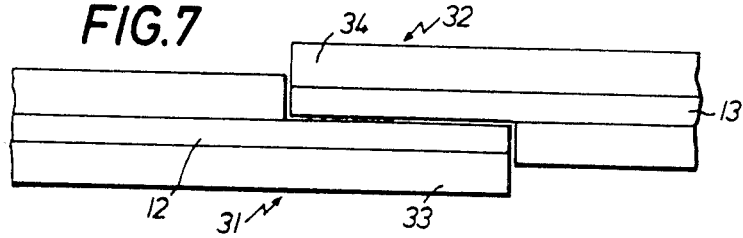
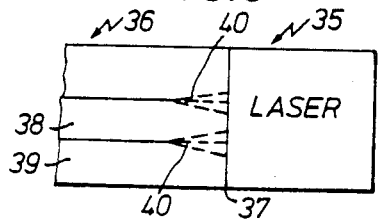
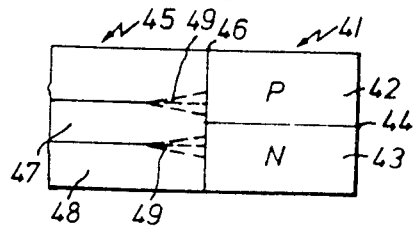

OPTICAL COUPLING ARRANGEMENT

BACKGROUND OF THE INVENTION

The present invention relates to an optical coupling arrangement for transmitting a light beam. In particular, the invention relates to an improved coupling arrangement which includes a light conductive fiber having an effective entrance or exit surface which is larger than the cross section of the core of the fiber. The invention is particularly suitable for coupling a light beam modulated with data from an output of one optical device to an input of another optical device, at least one of the optical devices being a light conductive fiber. The invention is also concerned with a method for producing the coupling arrangement.

The coupling of light waves in optical devices in which only a small number of modes can propagate, e.g. in light conductive fibers, produces considerable difficulties since the effective entrance and exit surfaces for the coupled light beams are extremely small in such fibers. The diameter of the core of a light conductive fiber in which the light energy is transmitted by substantially total reflection, lies in the order of magnitude of the wavelength of light so that a correspondingly accurate adjustment or placement is necessary for effecting the coupling.

It is known to effect optical coupling with the aid of lens arrangements, but this produces mode mismatching which leads to transmission losses.

It is also known to effect optical coupling of two optical devices by means of a hologram or an optical resonator, but these additional coupling elements are expensive and increase the total costs for such a coupling arrangement.

SUMMARY OF THE INVENTION

It is one object of the invention to provide an improved coupling arrangement with which it is possible to produce an approximately pure-mode coupling between two optical devices of which at least one is a light conductive fiber.

It is another object of the invention to provide an improved coupling arrangement in which a light conductive fiber is provided at a coupling point with an effective entrance surface or exit surface for a light beam which is larger than the cross section of its core.

It is a further object of the invention to provide an improved coupling arrangement in which a light conductive fiber is provided in the vicinity of its entrance surface or exit surface with an unabrupt transition of its index of refraction in a radial direction.

It is yet another object of the invention to provide an improved coupling arrangement free of any lens arrangement, hologram, optical resonator and/or the like.

It is yet a further object of the invention to provide a method of producing a light conductive fiber, which is particularly suitable for use in a coupling arrangement, by causing a partial material diffusion between the core material and the jacket material which form the fiber.

In its apparatus aspect, the invention is in a coupling arrangement for coupling a light beam from an output of one optical device to an input of another optical device, wherein at least one of the two optical devices is a light conductive fiber having a substantially totally reflecting core in a major portion of the fiber, the improvement that the light conductive fiber is provided at a coupling point with an effective entrance surface or exit surface for the light beam which is larger than the cross section of the totally reflecting core.

In its method aspect, the invention is a method of producing a light conductive fiber particularly suitable for use in a coupling arrangement comprising the steps of providing a light conductive fiber having a jacket made of material having a given index of refraction and a core made of material having a greater index of refraction, and subjecting a portion of the light conductive fiber in the vicinity of its coupling end to heat treatment at increased temperatures for causing a partial material diffusion between the core material and the jacket material.

BRIEF DESCRIPTION OF THE DRAWINGS

FIG. 1 is a diagrammatic illustration of a coupling between two optical devices, both optical devices as shown being light conductive fibers.

FIG. 2 shows a graphic illustration, not to scale, of the index of refraction characteristic with respect to the radius $r$ of a light conductive fiber shown diagrammatically.

FIG. 3 is a diagrammatic illustration of a light conductive fiber which has been heated, placed under tension in a longitudinal direction and cut in the vicinity of its coupling point.

FIG. 4 is a diagrammatic illustration of a light conductive fiber which has been heated, placed under compression in a longitudinal direction and cut in the vicinity of its coupling point.

FIG. 5 is a diagrammatic illustration of a light conductive fiber which has been heated, placed under compression in a longitudinal direction and cut obliquely in the vicinity of its coupling point.

FIG. 6 is a diagrammatic illustration of a light conductive fiber which has been heated, subjected to compression in a radial direction and cut in the vicinity of its coupling point.

FIG. 7 is a diagrammatic illustration of another embodiment of a coupling between two optical devices, both optical devices as shown being light conductive fibers, the coupling being provided by superimposed surfaces parallel to the longitudinal axis of the fibers.

FIG. 8 is a diagrammatic illustration of a coupling between a light conductive fiber and a semiconductor laser.

FIG. 9 is a diagrammatic illustration of a coupling between a light conductive fiber and a transversely irradiated photodiode.

DESCRIPTION OF THE PREFERRED EMBODIMENTS

In FIG. 1, the ends of two light conductive fibers 1 and 5 are shown which are connected together at a coupling point, illustrated generally at the numeral 9. The light conductive fibers 1 and 5 are constructed of a core 3 or 7, respectively, having an index of refraction $n_2$ as well as a jacket 2 or 6, respectively, having an index of refraction $n_1$ which is smaller than $n_2$. Over the major portion of the total length of the light conductive fiber 1, the fiber core 3 and the jacket 2 are clearly separated from one another so that the transition of the index of refraction from $n_2$ to $n_1$ is irregular and abrupt in the radial direction. Similarly, over a major portion of the total length of the light conductive fiber 5, the fiber core 7 and the jacket 6 areclearly separated from one another so that the transition of the index of refraction from $n_2$ to $n_1$ is irregular and abrupt in the radial direction. If this irregular and abrupt transition of the index of refraction were continued to coupling point 9, heavy transmission losses would be encountered when, for example, a light beam were to be coupled from the light conductive fiber 1 to the light conductive fiber 5 of the same configuration. If, however, the light conductive fibers 1 and 5 are, for example, thermally treated in the vicinity of their coupling ends, as indicated diagrammatically in FIG. 1, a continuous, smooth transition of the index of refraction can be produced in the radial direction from $n_2$ to $n_1$ in that portion of the core material is diffused into the jacket 2 or 6 and vice versa a portion of the jacket material diffuses into the core 3 or 7 as indicated diagrammatically by the broken lines 14 in FIG. 1. With light conductive fibers 1 and 5 having end portions 4 and 8, respectively, which have been treated in such a manner, it is then possible to couple light energy between the light conductive fibers 1 and 5 to an extremely high degree of efficiency. To provide light conductive fibers with these properties over their entire length is unfavorable due to the worsening guidance characteristics for light waves.

FIG. 2 shows a graphic illustration, not to scale, of the index of refraction of characteristic $n$, with respect to the radius $r$, of the light conductive fiber 1. An irregular, abrupt index of refraction characteristic shown by a solid line 10, is present along the major portion of the length of the light conductive fiber 1. The index of refraction characteristic becomes more and more regular and smooth as it approaches the coupling point 9, as indicated by the dashed, curved line 11.

The regular, smooth index of refraction characteristic in the end portion of the light conductive fiber 1, as shown in FIG. 2 by the dashed, curved line 11, is the result of the heat treatment mentioned above which results in the diffusion of some core material into the jacket 2 and some of the jacket material into the core 3, as illustrated diagrammatically by the broken lines 14 in FIG. 2.

FIG. 3 shows a further embodiment of a light conductive fiber 15, having a core 16 and a jacket 17, which has been treated along a portion thereof and placed under tension in the longitudinal direction thereby causing the light conductive fiber 15 to have a smaller diameter along its heated portion. As shown in FIG. 3, the light conductive fiber 15 has been severed at a cut point within the portion which was heated to provide a cut surface indicated generally by the reference letter S. This cut surface S also exhibits an improvement in cupling characteristics, as a result of the tensioning, which causes the light conductive fiber 15 to have a smaller diameter and cross section in the vicinity of the cut surface S, and as a result of material diffusion caused by heating, as indicated diagrammatically by broken lines 18.

FIG. 4 shows a further embodiment of a light conductive fiber 19, having a core 20 and a jacket 21, which has been heated along a portion thereof and placed in compression in the longitudinal direction thereby causing the light conductive fiber 19 to have a larger diameter along its heated portion. As shown in FIG. 4, the light conductive fiber 19 has been severed at a cut point within the portion which was heated to provide a cut surface indicated generally by the reference letter S. The cut surface S also exhibits an improvement in coupling characteristics, as a result of the compression, which causes the light conductive fiber 19 to have a larger diameter and cross section in the vicinity of the cut surface S, and as a result of material diffusion caused by heating, as indicated diagrammatically by broken lines 22.

The cut surface S may then lie, as shown in FIG. 4, substantially perpendicularly to the axis of the light conductive fiber 19 or, as shown in FIG. 5, in a direction oblique to the axis of the light conductive fiber 23 which comprises a core 24 and a jacket 25. The broken lines 26 in FIG. 5 indicate portions of the light conductive fiber 23 which are composed in part of diffused material. Thus it is possible further to increase the effective core 24 diameter or to change the effective cross section of the core 24.

FIG. 6 shows a further embodiment of a light conductive fiber 27, having a core 28 and a jacket 29. The light conductive fiber 27 has been heated along a portion thereof and subjected, along its heated portion, to a compression force in a radial direction with respect to its longitudinal axis which causes the light conductive fiber 27 to be flattened, its cross section becoming elliptical along its heated portion. As shown in FIG. 6, the light conductive fiber has been severed at a cut point within the portion which was heated to provide a cut surface indicated by the reference letter S. The cut surface S exhibits an improvement in coupling characteristics, as a result of the flattening, which causes the light conductive fiber 27 to have an elliptical cross section in the vicinity of the cut surface S, and as a result of material diffusion caused by heating, as indicated diagrammatically by the broken lines 30.

Changes in cross section of the type illustrated in FIG. 6 are of interest when the coupling is to be made, for example, to an optical device wheich is provided with an entrance or exit surface for the light beams which surface is very wide compared to its height, i.e. possibly the PN-junction of a laser diode or of a transversely irradiated photodiode.

A further possibility for increasing the effective entrance or exit surfaces of optical devices, particularly light conductive fibers, is shown in FIG. 7. The laterally ground ends of two light conductive fibers 31 and 32 are superimposed in parallel with little space therebetween so that the energy can be coupled from a core 12 of the light conductive fiber 31 to a core 13 of the light conductive fiber 32 and vice versa. As shown in FIG. 7, the light conductive fibers 31 and 32 include, respectively, jackets 33 and 34 which surround, respectively, the cores 12 and 13 except at those end portions where the cores 12 and 13 are exposed as a result of the lateral grinding.

It is of course also possible to replace one light conductive fiber 31 or 32 shown in FIG. 7 by an optical device of the type mentioned in the preceding paragraph. The coupling to such a device can be made particularly easily since the core 12 or 13 can be brought into contact with the entire PN-junction of a semiconductor laser or transversely irradiated photodiode.

As shown in FIG. 8, an optical coupling arrangement includes a semiconductive laser 35 and a light conductive fiber 36 connected together at a coupling point 37. The light conductive fiber 36 includes a core 38 and a jacket 39 having, respectively, an index of refraction $n_2$ and $n_1$. The index of refraction $n_1$ is smaller than the index of refraction $n_2$. A portion of the light conductive fiber 36 has been heat treated, cut and, if desired, the light conductive fiber 36 may have been subjected to tension or to compression, as disclosed above in relation to FIGS. 1–6. While an irregular and abrupt change in the index of refraction characteristic exists along the major portion of the light conductive fiber 36, the index of refraction characteristic becomes more and more regular and smooth as it approaches the coupling point 37. The broken lines 40 illustrate diagrammatically a portion of the light conductive fiber 36 in which core material has been diffused into a portion of the jacket 39 and jacket material has been diffused into the core 38.

As illustrated in FIG. 9, an optical coupling arrangement includes a photodiode 41, which includes a P-zone 42 and an N-zone 43 separated by a PN-junction 44, and a light conductive fiber 45 connected together at a coupling point 46. The light conductive fiber 45 includes a core 47 and a jacket 48 having, respectively, an index of refraction $n_2$ and $n_1$. The index of refraction $n_1$ is smaller than the index of refraction $n_2$. A portion of the light conductive fiber 45 has been heat-treated, cut and, if desired, the light conductive fiber 45 may have been subjected to tension or to compression, as disclosed above in relation to FIGS. 1–6. The index of refraction characteristic, while irregular and abrupt along a major portion of the light conductive fiber 45, becomes more and more regular and smooth as it approaches the coupling point 46. The broken lines 49 illustrate diagrammatically a portion of the light conductive fiber 45 in which material from the core 47 and material from the jacket 48 have diffused, respectively, into the jacket 48 and the core 47.

In all light conductive fiber embodiments mentioned above, it is of course also possible to produce the light conductive fiber ends, whose index of refraction characteristic has been changed, as individual pieces and to use them as short coupling elements.

Furthermore, the inputs or outputs of the optical devices can be placed directly on top of one another for coupling or the contact may be made via a reflection reducing substance, such as an immersion oil, or by means of a transparent adhesive.

Method Example 1

A light conductive fiber of substantially circular cross section and having a diameter of about 50 microns is provided. The light conductive fiber includes a jacket made of Schott-AR-glass and having an index of refraction of 1.516, and a core centrally positioned within the jacket. The core is of substantially circular cross section and has a diameter of about 1 micron. The core is made of Schott-LF 5-glass and has an index of refraction of 1.578. A portion of the light conductive fiber is heated to from about 500° C to about 520° C for from about 10 sec. to about 600 sec. The heated portion is allowed to cool to room temperature, and the light conductive fiber severed within that portion which was heated. The resulting light conductive fiber is shown as a part of FIG. 1.

Method Example 2

The light conductive fiber is prepared as in Example 1 with the additional step of subjecting the light conductive fiber while in heated condition to a tension force, in a longitudinal direction, of about 10 grams for about 10 sec. The resulting light conductive fiber is shown in FIG. 3.

Method Example 3

The light conductive fiber is prepared as in Example 1 with the additional step of subjecting the light conductive fiber while in heated condition to a compression force, in a longitudinal direction, of about 20 grams for about 20 sec. The resulting light conductive fiber is shown in FIG. 4.

Method Example 4

The light conductive fiber is prepared as in Example 1 with the additional step of subjecting the heated part of the light conductive fiber while in heated condition to a compression force, in a radial direction, of about 100 grams for about 30 sec. The resulting light conductive fiber is shown in FIG. 6.

Method Examples 5–8.

The light conductive fiber is prepared as in any one of the examples 1–4, the severing step being accomplished by cutting the light conductive fiber obliquely.

Method Examples 9–12

The light conductive fiber is prepared as in any one of the Examples 1–4, the severing step being accomplished by grinding.

It will be understood that the above description of the present invention is susceptible to various modifications, changes and adaptations and the same are intended to be comprehended within the meaning and range of equivalents of the appended claims.

We claim:

1. In a coupling arrangement for coupling a light beam from an output of one optical device to an input of another optical device wherein at least one of the two optical devices is a light conductive fiber having a longitudinal axis and including a substantially totally reflecting core in a major portion of the fiber, a jacket which surrounds the core and is made of material having a given index of refraction, and where the core is made of a material having a greater index of refraction than that of the jacket and has a diameter on the order of magnitude of the wavelength of light, the improvement wherein the fiber has an end surface for the passage of the light beam into or from said core, the material of said core and the material of said jacket are blended together only in the vicinity of said surface for the passage of the light beam so as to provide an unabrupt transition of the index of refraction in a radial direction in the vicinity of said surface, whereby efficient coupling to or from the light conductive fiber at a coupling point is effected.

2. The coupling arrangement as defined in claim 1 wherein the output of the one optical device and the input of the other optical device are directly opposite to one another and are disposed on a substantially common axis.

3. The coupling arrangement as defined in claim 2 wherein the output of the one optical device is connected with the input of the other optical device by direct contact.

4. The coupling arrangement as defined in claim 3 wherein the output of the one optical device is an emission surface of a semiconductor laser, the other optical device being the light conductive fiber.

5. The optical coupling arrangement as defined in claim 3 wherein the input of the other optical device is an absorption surface of a transversely irradiated photodiode, the one optical device being the light conductive fiber.

6. The coupling arrangement as defined in claim 2 wherein the output of the one optical device is connected with the input of the other optical device via a reflection reducing substance.

7. The coupling arrangement as defined in claim 6 wherein the output of the one optical device is an emission surface of a semiconductor laser, the other optical device being the light conductive fiber.

8. The optical coupling arrangement as defined in claim 6 wherein the input of the other optical device is an absorption surface of a transversely irradiated photodiode, the one optical device being the light conductive fiber.

9. The coupling arrangement as defined in claim 2 wherein the output of the one optical device is an emission surface of a semiconductor laser, the other optical device being the light conductive fiber.

10. The optical coupling arrangement as defined in claim 2 wherein the input of the other optical device is an absorption surface of a transversely irradiated photodiode, the one optical device being the light conductive fiber.

11. The coupling arrangement as defined in claim 1 wherein the output of the one optical device is connected with the input of the other optical device by direct contact.

12. The coupling arrangement as defined in claim 11 wherein the output of the one optical device is an emission surface of a semiconductor laser, the other optical device being the light conductive fiber.

13. The optical coupling arrangement as defined in claim 11 wherein the input of the other optical device is an absorption surface of a transversely irradiated photodiode, the one optical device being the light conductive fiber.

14. The coupling arrangement as defined in claim 1 wherein the output of the one optical device is connected with the input of the other optical device via a reflection reducing substance.

15. The coupling arrangement as defined in claim 14 wherein the output of the one optical device is an emission surface of a semiconductor laser, the other optical device being the light conductive fiber.

16. The optical coupling arrangement as defined in claim 14 wherein the input of the other optical device is an absorption surface of a transversely irradiated photodiode, the one optical device being the light conductive fiber.

17. The coupling arrangement as defined in claim 1 wherein the output of the one optical device is an emission surface of a semicondcutor laser, the other optical device being the light conductive fiber.

18. The optical coupling arrangement as defined in claim 1 wherein the input of the other optical device is an absorption surface of a transversely irradiated photodiode, the one optical device being the light conductive fiber.

19. The coupling arrangement as defined in claim 1 wherein said surface for the passage of the light beam is formed on an end of the light conductive fiber which has been deformed in the vicinity of said end by being subjected to tension in a longitudinal direction while in a heated condition.

20. The coupling arrangement as defined in claim 1 wherein said surface for the passage of the light beam is formed on an end of the light conductive fiber which has been deformed in the vicinity of said end by being subjected to compression in a longitudinal direction while in a heated condition.

21. The coupling arrangement as defined in claim 1 wherein the light conductive fiber is of elliptical cross-section at least in the vicinity of its passage surface.

22. The coupling arrangement as defined in claim 1 wherein said surface for the passage of the light beam is substantially perpendicular to the longitudinal axis of the core.

23. The coupling arrangement as defined in claim 1 wherein said surface for the passage of the light beam is oblique to the longitudinal axis of the core.

24. In a coupling arrangement for coupling a light beam from an output of one optical device to an input of another optical device wherein at least one of the two optical devices is a light conductive fiber having a longitudinal axis and including a substantially totally reflecting core in a major portion of the fiber, a jacket which surrounds the core and is made of material having a given index of refraction, and where the core is made of a material having a greater index of refraction than that of the jacket and has a diameter on the order of magnitude of the wavelength of light, the improvement wherein the fiber has a surface for the passage of the light beam into or from said core, the materials of said core and said jacket are blended together in the vicinity of said surface for the passage of light such that said fiber has an unabrupt transistion in the index of refraction in a radial direction in such vicinity and the cross section of said fiber in the vicinity of said surface for the passage of the light beam is smaller than in the remainder of said fiber due to being deformed by being subjected to tension in a longitudinal direction while in a heated condition, whereby efficient coupling to or from the light conductive fiber at a coupling point is effected.

* * * * *